(12) United States Patent
Ulekleiv et al.

(10) Patent No.: US 9,353,910 B2
(45) Date of Patent: May 31, 2016

(54) BOSS FOR COMPOSITE PRESSURE CONTAINER

(75) Inventors: Rune Ulekleiv, Gjøvik (NO); Per Vidar Hamnvik, Raufoss (NO)

(73) Assignee: HEXAGON RAGASCO AS, Raufoss (NO)

( * ) Notice: Subject to any disclaimer, the term of this patent is extended or adjusted under 35 U.S.C. 154(b) by 0 days.

(21) Appl. No.: 14/127,664

(22) PCT Filed: Jun. 27, 2012

(86) PCT No.: PCT/EP2012/062476
§ 371 (c)(1),
(2), (4) Date: Apr. 4, 2014

(87) PCT Pub. No.: WO2013/000959
PCT Pub. Date: Jan. 3, 2013

(65) Prior Publication Data
US 2014/0299610 A1    Oct. 9, 2014

(30) Foreign Application Priority Data

Jun. 28, 2011   (NO) .................................. 20110931

(51) Int. Cl.
*F17C 1/16* (2006.01)
*F17C 1/06* (2006.01)
*F17C 13/04* (2006.01)

(52) U.S. Cl.
CPC ... *F17C 1/16* (2013.01); *F17C 1/06* (2013.01); *F17C 13/04* (2013.01); *F17C 2201/0109* (2013.01); *F17C 2201/056* (2013.01); *F17C 2203/0604* (2013.01); *F17C 2203/066* (2013.01); *F17C 2203/0619* (2013.01); *F17C 2203/0663* (2013.01); *F17C 2205/0305* (2013.01); *F17C 2205/0323* (2013.01); *F17C 2205/0394* (2013.01); *F17C 2209/2118* (2013.01); *F17C 2209/2127* (2013.01); *F17C 2209/227* (2013.01); *F17C 2221/012* (2013.01);
(Continued)

(58) Field of Classification Search
CPC ............ F17C 13/04; F17C 2205/0302; F17C 2205/0305; F17C 2205/0323; F17C 2260/036
See application file for complete search history.

(56) References Cited

U.S. PATENT DOCUMENTS 4,765,507 A * 8/1988 Yavorsky et al. ............. 220/590
5,253,778 A   10/1993 Sirosh
(Continued)

FOREIGN PATENT DOCUMENTS

EP   0 958 473    6/2003
EP   2 000 734    12/2008
(Continued)

OTHER PUBLICATIONS

International Search Report issued Sep. 13, 2012 in International Application No. PCT/EP2012/062476.
(Continued)

*Primary Examiner* — Anthony Stashick
*Assistant Examiner* — Mollie Llewellyn
(74) *Attorney, Agent, or Firm* — Wenderoth, Lind & Ponack, L.L.P.

(57) ABSTRACT

A boss (1) for a composite pressure container for fluids, in which the radial thickness of a lip (23) of the boss arranged between the coupling or valve member (5) and an embedded member (2) is especially adapted to the intended pressure inside the container.

7 Claims, 3 Drawing Sheets

(52) U.S. Cl.
CPC .... *F17C 2221/033* (2013.01); *F17C 2221/035* (2013.01); *F17C 2223/0123* (2013.01); *F17C 2223/0153* (2013.01); *F17C 2223/035* (2013.01); *F17C 2223/036* (2013.01); *F17C 2260/021* (2013.01); *F17C 2260/036* (2013.01); *F17C 2260/037* (2013.01); *F17C 2260/042* (2013.01); *F17C 2270/01* (2013.01); *Y02E 60/321* (2013.01)

(56) References Cited

U.S. PATENT DOCUMENTS

| | | | | |
|---|---|---|---|---|
| 5,494,188 | A | 2/1996 | Sirosh | |
| 8,863,977 | B2 * | 10/2014 | Koppert et al. | 220/592 |
| 2008/0251520 | A1 * | 10/2008 | Ota et al. | 220/586 |
| 2010/0163565 | A1 | 7/2010 | Matsuoka et al. | |

FOREIGN PATENT DOCUMENTS

| | | |
|---|---|---|
| EP | 1 204 833 | 9/2010 |
| NO | 306336 | 10/1999 |
| NO | 309667 | 3/2001 |
| NO | 312048 | 3/2002 |

OTHER PUBLICATIONS

Norwegian Search Report issued Nov. 15, 2011 in Norwegian Application No. 20110931.

Written Opinion of the International Searching Authority issued Sep. 13, 2012 in International Application No. PCT/EP2012/062476.

* cited by examiner

BOSS FOR COMPOSITE PRESSURE CONTAINER

BACKGROUND OF THE INVENTION

1. Technical Field

The present invention relates to a boss for a composite pressure container. The invention especially relates to a boss especially adapted to withstand pressure for the whole duration of the life cycle of the composite pressure container.

2. Description of the Related Art

This invention concerns an improved boss for a composite pressure container for fluids. The container includes an inner fluid-tight thermoplastic liner layer and a pressure supporting layer formed by winding fibre-reinforcement onto the liner layer, as well as at least one central aperture in at least one end, for provision of a boss for mounting a coupling or a valve member.

A boss for composite pressure containers is disclosed in Norwegian Patent No. 312048. Composite pressure containers are disclosed in Norwegian Patents No. 306226 and 309667.

Pressure containers like these are subject to numerous and varied types of stress and forces. Mainly, this regards the inner over pressure which may occur when filling the container with fluids. The inner pressure will influence the boss with an axially outward directed force which may be considerable. Additionally, the boss construction may be influenced by an axially inward directed force, e.g., when a valve or coupling member is mounted to the boss, and possibly by unintended stress caused by impacts or blows. It is important that the construction and mounting/fixation of the boss is also capable of resisting such forces. The same is valid for torsion forces which may occur when, for instance, the valve member is mounted onto the boss, which is usually formed with threads and screwed into the boss. Torsion forces to be concerned in this regard could also occur when the fibre reinforcement is winded onto the inner liner. It is especially important that the boss provides a safe and durable seal against the adjacent parts of the pressure container. The sealing has to be such that the above-mentioned forces are not damaging to the sealing effect.

Norwegian Patent No. 312048, mentioned above, discloses a boss suitable for use in the present type of pressure containers.

Composite pressure containers can contain different fluids such as propane and butane, for domestic use often with a relatively low maximum pressure of about 35 bars. The containers can also hold fluids such as CNG, hydrogen and other industrial gas types often requiring a higher maximum pressure of about 200 bars. Composite pressure containers may be adapted to withstand test pressures up to 2000 bars or even higher.

The prior art disclose the use of O-rings to seal the passage between a boss and a coupling or valve member. When the container contains a fluid, the O-ring will be in contact with the fluid present in the container. The present inventors have observed that the O-rings under the prevailing conditions within a boss have a tendency to swell when in contact with the fluid. The swelling of and pressure from the O-rings may cause indentations in the opposing sealing surfaces which subsequently may cause leakage for instance if the coupling or valve member or the O-rings are changed.

SUMMARY OF THE INVENTION

Thus, it is an object of the present invention to provide a boss suitable for use in composite pressure containers holding fluids of not only relatively low pressures, but which can also be used on pressure containers holding fluids of higher pressures, and which boss is not expensive to produce.

The pressure, temperature or concentration differences over the boss materials may cause permeation of fluid through the materials. This is especially relevant in connection with sealing structures such as O-rings and sealing surfaces.

A further object of the present invention is to provide a boss with long durability also at high pressures, thereby allowing the container to be reused many times and reducing the costs.

It is also an object to provide a boss in which the possible influence of the swelling of the O-rings on the sealing capacity is reduced.

To obtain these and other objectives, the present invention provides a boss for a composite pressure container for fluids, wherein the pressure container comprises an inner fluid-tight liner layer and a pressure supporting layer formed by winding fibre-reinforcement onto the liner layer, as well as at least a central opening in one end provided with the boss, where the boss is adapted for mounting a coupling or valve member. The boss includes mounting means adapted to receive the coupling or valve member. The coupling or valve member comprises at least one O-ring on an engaging surface for engagement with the mounting means, and the boss comprises an imbedded member at least fully imbedded towards the inside of the pressure container. The boss further comprises a lip arranged to be positioned between the imbedded member and the engaging surface of the coupling or valve member. The radial thickness of the lip is proportional with the test pressure for which the container is intended.

A pressure container may comprise one boss according to the present invention installed in one opening at one end of the container. A pressure container may also comprise two bosses according to the present invention arranged in two openings each arranged at opposite ends of the pressure container. It is also possible to provide a pressure container with one boss according to the present invention and one or more other types of bosses. Generally the number of bosses equals the number of openings in the pressure container.

In one aspect of the present invention, the radial thickness D of the lip decreases with increasing test pressure.

In another aspect the radial thickness D of the lip decreases with decreasing material thickness of the at least one O-ring.

In yet another aspect the radial thickness D of the lip decreases with decreasing Shore A hardness of the at least one O-ring.

In one embodiment of the boss, according to the present invention, the Shore A hardness H of the at least one O-ring is:

$$70 \leq H \leq 90$$

the material diameter d in mm of the at least one O-ring is:

$$1 \leq d \leq 6$$

the maximum radial thickness $D_{max}$ of the lip in mm is $$D_{max} = -0.0005 * p + 3.005$$

wherein p=test pressure in bar
and the radial thickness D of the lip is $$D_{min} \leq D \leq D_{max}$$

wherein $D_{min}$=minimum radial thickness of the lip in mm $$D_{min} = -0.000125 * p + 0.35$$

In another embodiment of the present invention the relationship between the ratio between the Shore A hardness H of the at least one O-ring and the thickness D in mm of the lip at a test pressure p in bars is $H/D = a*p + b$ wherein $0.03 < a < 0.05$ and $25 < b < 35$.

In a further aspect the present invention provides a boss. The boss is intended for a composite pressure container with a test pressure of minimum 10 bars and where the thickness of the lip is less than 2.5 mm, or a boss is intended for a composite pressure container with a test pressure of minimum 30 bars and where the thickness of the lip is less than 2.45 mm, or a boss is intended for a composite pressure container with a test pressure of minimum 300 bars and where the thickness of the lip is 1.775 mm or less.

In one embodiment, the boss according to the present invention comprises a connecting flange for connecting to the liner layer, and a neck part axially placed outside the connecting flange. The fibre-reinforcement of the pressure container is winded against the neck part.

The term "test pressure" as applied here refers to the pressure within the container used for testing the container for the intended use. Test pressure is normally minimum 1.5 times the regulatory defined operating pressure. After filling and during normal handling and emptying conditions, the pressure within the container will generally be lower than the test pressure. Examples of applicable test pressures include but are not limited to:
- Not less than 10 bars, special low pressure applications like beverage;
- Not less than 30 bars, LPG/cooling gas and other types of gas;
- Not less than 300 bars, CNG, breathing gas, and industrial gas applications; and
- Not less than 600 bars, hydrogen and other special high pressure applications.

BRIEF DESCRIPTION OF THE DRAWINGS

The invention will now be described with reference to the examples which are shown in the figures, wherein.

DETAILED DESCRIPTION OF THE INVENTION

Figure 1:
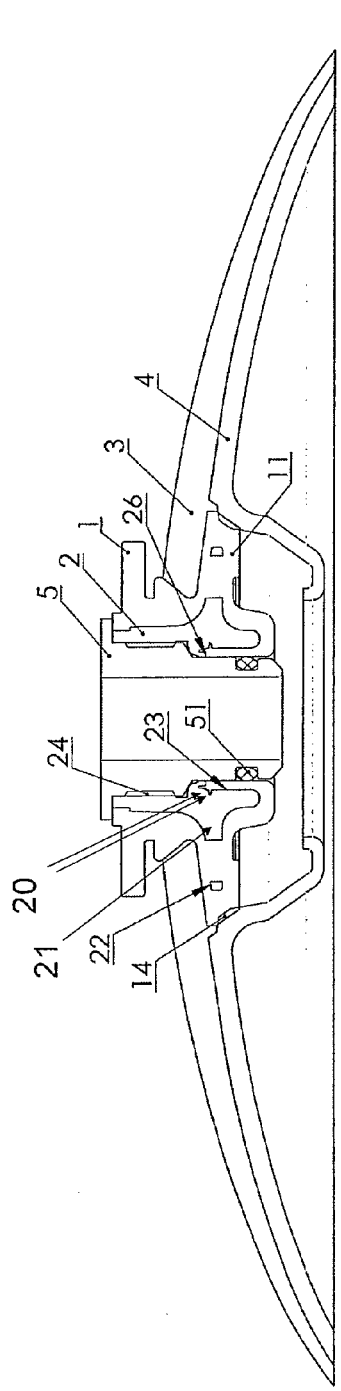
FIG. 1 is a sectional view of an embodiment of the boss adapted for the pressure within the container.
Figure 2:
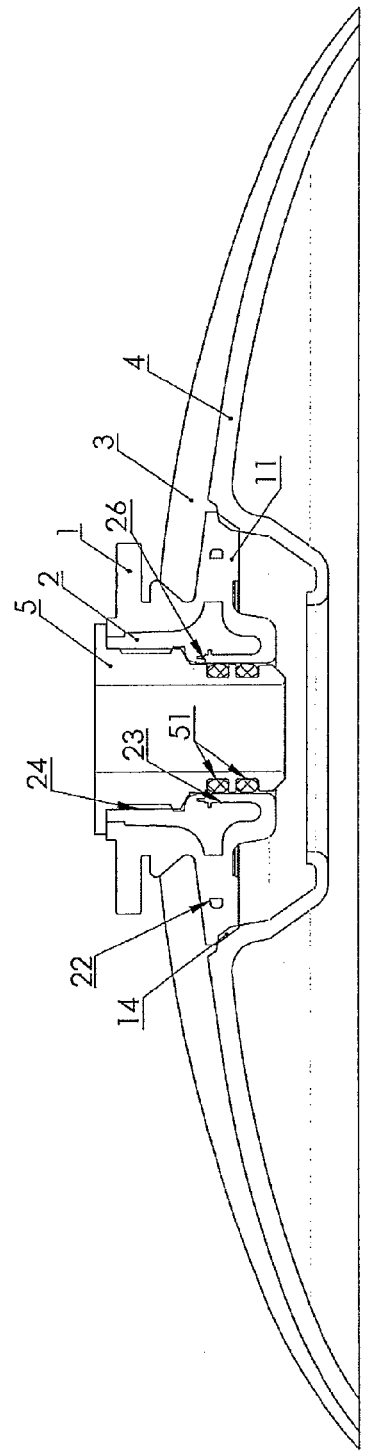
FIG. 2 is a sectional view of another embodiment of the boss adapted for the pressure within the container.

FIGS. 1 and 2 illustrate two alternative embodiments of the present invention. Both figures show a boss 1 on a pressure container, wherein the boss includes an opening in which opening a coupling or valve member 5 is fitted. The boss 1 is welded, glued, cast, moulded, or in another way fixed to an inner liner layer 4 on the composite pressure container with a connecting flange 11. Alternatively the boss is an integrated part of the liner layer. On top of the connecting flange and the liner layer, a fibre-reinforced layer 3 is winded in a way that is known per se. The fibre-reinforced layer thus functions as a pressure supporting layer, both for the boss 1 and the liner layer 4.

The boss comprises a neck part 12 which is placed axially outside the connecting flange and pressure container. The fibre-reinforcement is winded against the neck part, which provides for good control of the winding of the fibre-reinforcement, and prevents the fibre-reinforcement from covering the opening.

The boss comprises a central axial opening for mounting a coupling or valve member 5.

In addition, the boss includes an embedded member 2. The embedded member 2 is made from a material with at least sufficient structural consistency to allow for repeated connecting and detachment of the coupling or valve member 5. The material for the embedded member 2 may be different from or equal to the material of the rest of the boss 1 in which the embedded member 2 is embedded. The embedded member comprises an opening which is fitted with mounting means 24 for mounting the coupling or valve member 5. The embedded member 2 may be metal or other structural materials, e.g. fibre-reinforced plastic.

In the illustrated embodiment the embedded member is substantially cast embedded except for the mounting means 24 through injection molding of the remaining material constituting the boss. The embedded member 2 is preferably formed with a lower flange 21, which extends radially inside the connecting flange 11. In this way, the pressure supporting fibre-reinforcement will also cover the outer part of the lower flange of the embedded member, and thus, prevent movement in an axial direction. The mounting means 24, including a threaded part 24, which is formed to receive coupling or valve member 5. Further the opening in the boss has a supporting surface 26.

Only the outer surface of the coupling or valve member 5 is illustrated in detail on the figures, as the invention illustrated on the FIGS. 1 and 2 relates to the connection between the coupling or valve member 5 and the boss 1 and not to the internal configuration of the coupling or valve member as such.

The mounting means 24 for mounting the coupling or valve member 5 is, in this embodiment, cylindrical threads.

Normally, it is difficult to achieve adhesion between the embedded member and the rest of the boss. Relative movement between these parts, e.g., because of sagging of the plastic parts, leads to the occurrence of a leakage point for the content of the pressure container along the interface between the embedded member and the boss.

Figure 1A:
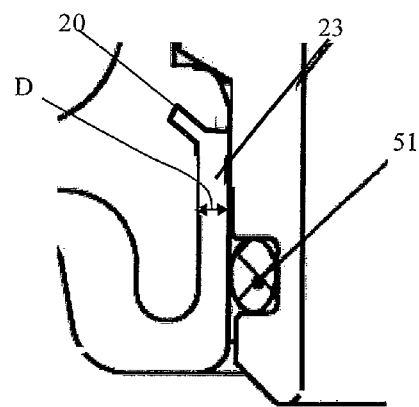
FIG. 1a illustrates an enlarged section of the boss according to FIG. 1.

The boss further comprises a lip 23 formed from the material of the boss, which upon mounting of the coupling or valve member 5 is positioned between the valve member and the embedded member 2 at the end of the boss axially opposite the neck 12, and arranged inside the pressure container. FIG. 1a is an enlarged view of the section of the boss comprising the lip 23. The surface of the lip facing the opening forms the sealing surfaces at the inner end of the opening, in that the material of the boss embeds the embedded member in the inner part of the opening.

The lip 23 may comprise one or more protruding engagement parts 20. The protruding engagement parts 20 increases the attachment of the lip 23 to the embedded member 2 thereby ensuring that the lip 23 is not detached from the embedded member 2 when the coupling or valve member 5 is positioned or removed. In the embodiment illustrated in FIG. 1a, one inclined protruding part is present which provides resistance both to axial and radial movement of the lip 23. In the embodiments illustrated in FIGS. 1 and 2, the lip comprises two protruding parts 20 one in the axial direction and one in the radial direction. The valve member is fitted with one or more O-rings 51, see FIGS. 1 and 2, respectively, to further improve the sealing between the outer surface of the coupling or valve member and mounting means and supporting surfaces of the boss. This lip 23 is placed on the outside of the embedded member. The sealing is achieved on the inside of the leakage channel between the embedded member 2 and the rest of the boss 1.

Contents under pressure within the container will result in pressure directed from the inside of the container towards the boss 1. Such pressures result in forces against the inner part of the boss pressing the part of the boss comprising the lip 23 towards the O-rings 51, 51' thereby enhancing the sealing effects of the O-rings. The hardness and thickness of the lower part of the embedded member comprising the engagement surface 26 should be selected relative to the pressure so as to allow for the engagement surface 26 to apply pressure on the O-ring and thereby provide a gas tight seal.

The boss and the liner layer are produced in a known way of a polymer material, preferably by injection moulding and blow moulding respectively; however, other materials or production methods may also be contemplated.

The connecting flange is fixed to the liner layer 4 through an inclined surface 14. As mentioned above, the fixation may be carried out in a known way by welding or by alternative joining techniques, depending on the materials used. Alternatively, to the solution shown, the boss is an integrated part of the liner layer or the liner layer may be melted together with the connecting flange to form a continuous surface toward the opening.

To prevent movement of the embedded member 2 caused by torsion as well as by inwardly directed forces, e.g., when fixing a valve, the embedded member is, in this embodiment, formed with gripping organs 22 which prevent rotational movement for the embedded member 2 relative to the pressure container. These gripping organs 22 may be formed as holes, recesses or grooves in the embedded member.

In one aspect of the present invention illustrated in the embodiments shown in FIGS. 1 and 2, the thickness of the lip 23 is adapted to the pressure of the fluid to be contained inside the container. The term thickness refers to the radial thickness of the lip in the area which upon mounting of the valve member 5 is adjacent to the O-ring(s) 51. In FIG. 1a, the thickness is illustrated as the distance D. In the embodiment illustrated in FIG. 1, one O-ring on the valve 5 is in contact with the lip 23. In the other embodiment illustrated in FIG. 2, two O-rings are included between the valve member and the boss. Further, O-rings can also be included between the lip 23 and the coupling or valve member 5.

The employed O-ring(s) can be adapted in size and material to the pressure and compounds forming the content of the container.

Figure 3:
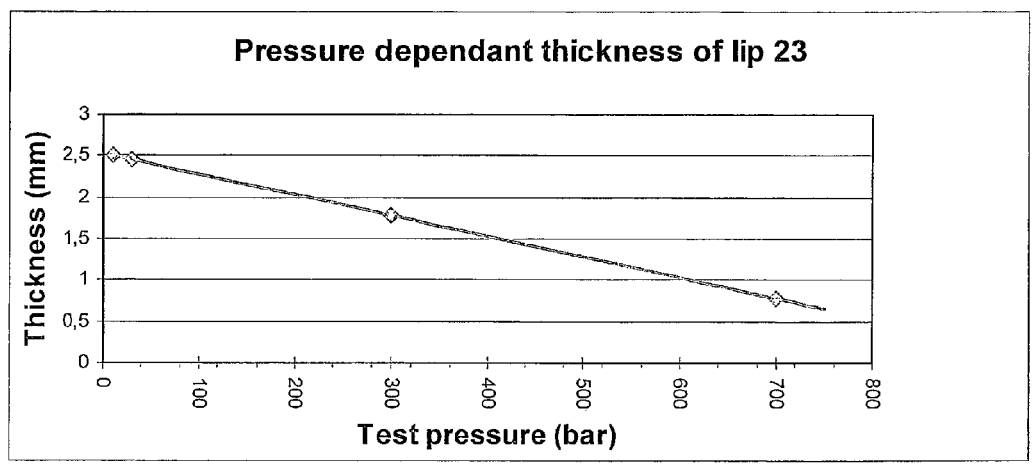
FIG. 3 is a graph visualizing the pressure dependency of a typical applicable radial thickness of the lip.

The radial thickness of the lip 23 is adapted to the intended pressure interval. The higher pressure the container is produced to hold, the smaller the thickness of the lip 23 should be. FIG. 3 illustrates the dependency between the radial thickness of the lip 23 and the applicable test pressure within the container for one embodiment of the present invention. The graph illustrates that for a container with a test pressure of 30 bar, the thickness of the lip 23 should be 2.45 mm or less. Whereas for a container with a test pressure of 300 bar, the thickness of the lip 23 should be 1.775 mm or less.

In a preferred embodiment where the boss is cast of a thermoplastic material, the radial thickness of the lip 23 is approximately 1.5 mm for a 30 bar container and 1.0 mm for a 200 bar container.

Figure 4:
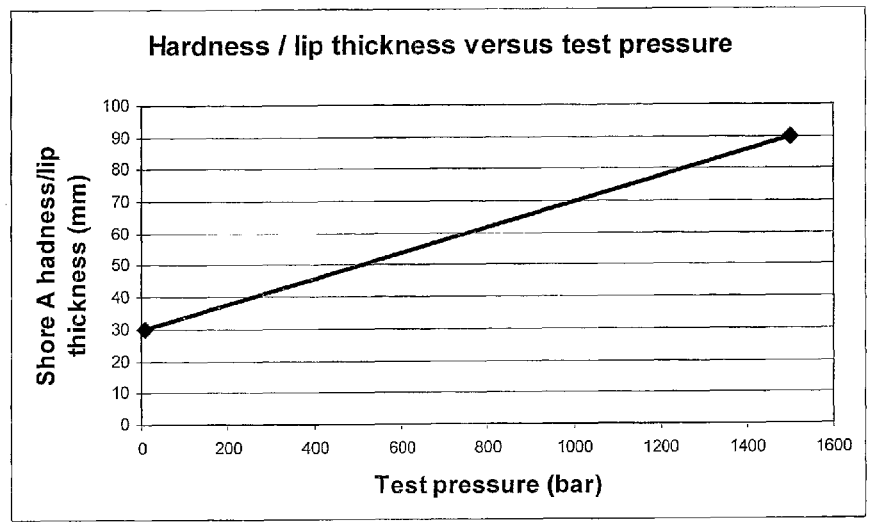
FIG. 4 is a graph illustrating the relationship between the test pressure and the ratio of the Shore A hardness of the O-ring and the thickness of the lip 23.

FIG. 4 illustrates the relationship between the ratio of the hardness (Shore A) and the thickness of the lip 23 in mm as a function of the test pressure.

The ratio should be 30 mm$^{-1}$ or higher at a test pressure of 10 bars and 90 mm$^{-1}$ or higher at a test pressure of 1500 bars.

The relationship between the ratio between the Shore A hardness H of the at least one O-ring 51 and the thickness D in mm of the lip 23 at a test pressure p in bars can be described as follows:

$$H/D = a*p + b \text{ wherein } 0.03 < a < 0.05 \text{ and } 25 < b < 35.$$

To illustrate this further the following table provides the maximum lip thicknesses for two preselected O-rings having a Shore A hardness of 75 and 90, respectively.

| Test pressure Bars | Maximum lip thickness for O-ring with Shore A hardness = 75 mm | Maximum lip thickness for O-ring with Shore A hardness = 90 mm |
|---|---|---|
| 10 | 2.50 | 3.00 |
| 100 | 2.23 | 2.68 |
| 200 | 1.99 | 2.39 |
| 500 | 1.51 | 1.81 |
| 1000 | 1.07 | 1.29 |
| 1500 | 0.83 | 1.00 |

Figure 5:
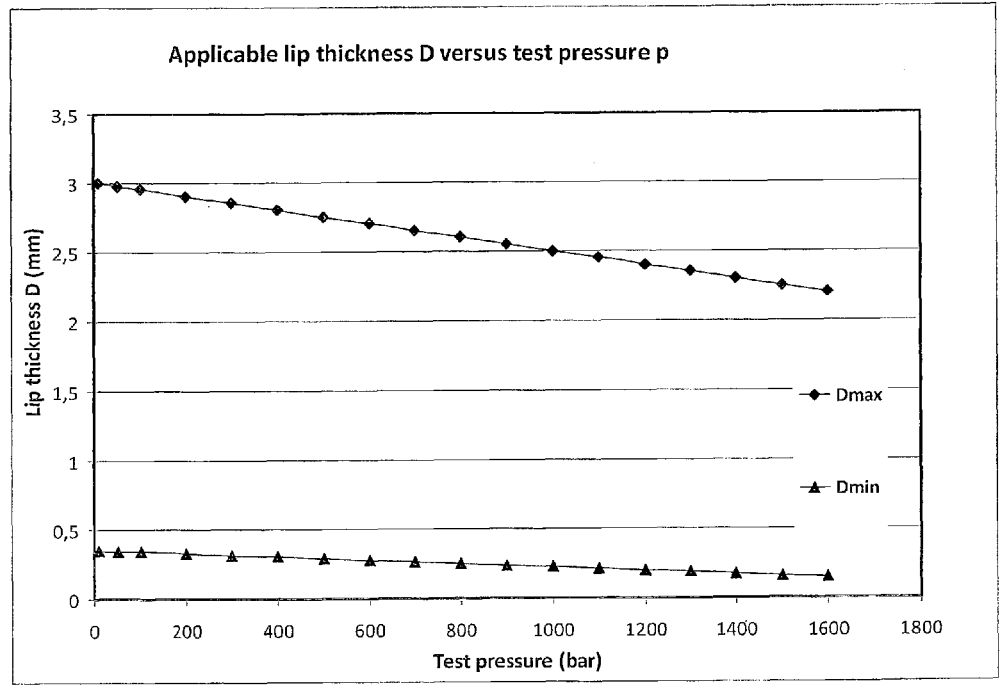
FIG. 5 shows a graph illustrating $D_{min}$ and $D_{max}$ versus the test pressure.

FIG. 5 is a graph showing $D_{min}$ and $D_{max}$ for a ratio of test pressures from 1-1600 bars. According to one embodiment of the present invention, the thickness of the lip 23 for a given test pressure should be selected to fall within the interval $D_{min}$–$D_{max}$ for the given pressure. The graph is based on the Shore A hardness H of the at least one O-ring being:

$$70 \leq H \leq 90$$

the material diameter d in mm of the at least one O-ring is:

$$1 \leq d \leq 6$$

the maximum radial thickness $D_{max}$ of the lip 23 in mm is $$D_{max} = -0.0005*p + 3.005$$

wherein p=test pressure in bar
the minimum radial thickness $D_{min}$ of the lip 23 in mm $$D_{min} = -0.00047*p + 1.0047$$

The production of any of the embodiments of the boss may be performed using well known commercially available methods.

The invention claimed is:

1. A composite pressure container for fluids, comprising an inner fluid-tight liner layer and a pressure supporting layer formed by winding fiber-reinforcement onto the liner layer, as well as at least a central opening in one end provided with a boss and a coupling or valve member, the boss is adapted for mounting the coupling or valve member, and comprises mounting means adapted to receive the coupling or valve member,
  wherein the coupling or valve member comprises at least one O-ring on an engaging surface for engagement with the mounting means,
  wherein the boss comprises an embedded member at least embedded towards the inside of the pressure container, and
  wherein the boss comprises a lip arranged to be positioned between the embedded member and the engaging surface of the coupling or valve member,
  wherein the radial thickness D of the lip is proportional with the test pressure for which the container is intended, wherein the Shore A hardness H of the at least one O-ring is: $70 \leq H \leq 90$, the material diameter d in mm of the at least one O-ring is: 1≤d≤6, the maximum radial thickness Dmax of the lip in mm is: −0.0005 mm/bar*p+ 3.005 mm, wherein p=test pressure in bar, and the radial thickness D of the lip is Dmin≤D≤Dmax, wherein Dmin=minimum radial thickness of the lip in mm and Dmin=−0.000125 mm/bar*p+0.35 mm.

2. The composite pressure container according to claim 1, wherein the radial thickness D of the lip decreases with decreasing material diameter d of the at least one O-ring.

3. The composite pressure container according to claim 2, wherein the radial thickness D of the lip decreases with decreasing Shore A hardness of the at least one O-ring.

4. The composite pressure container according to claim 1, wherein the radial thickness D of the lip decreases with decreasing Shore A hardness of the at least one O-ring.

5. The composite pressure container according to claim 1, wherein the boss is intended for a composite pressure container with a test pressure of a minimum 10 bars and where the thickness (D) of the lip is 2.5 mm.

6. The composite pressure container according to claim 1, wherein the boss is intended for a composite pressure container with a test pressure of a minimum 30 bars and where the thickness (D) of the lip is 2.45 mm.

7. The composite pressure container according to claim 1, wherein the boss is intended for a composite pressure container with a test pressure of minimum 300 bars and where the thickness (D) of the lip is 1.775 mm.

\* \* \* \* \*